United States Patent [19]

Wright et al.

[11] 4,053,886
[45] Oct. 11, 1977

[54] STEPPED DUAL-FREQUENCY, OCEAN-WAVE SPECTROMETER

[75] Inventors: John W. Wright, Accokeek, Md.; William J. Plant, Annandale; Dale L. Schuler, Springfield, both of Va.

[73] Assignee: The United States of America as represented by the Secretary of the Navy, Washington, D.C.

[21] Appl. No.: 743,374

[22] Filed: Nov. 19, 1976

[51] Int. Cl.² .............................................. G01S 9/60
[52] U.S. Cl. .............................. 343/5 SA; 343/5 W
[58] Field of Search ............................. 343/5 SA, 5 W

[56] References Cited

U.S. PATENT DOCUMENTS 3,719,946   3/1973   Sletten et al. ..................... 343/5 SA

FOREIGN PATENT DOCUMENTS 298,911   6/1971   U.S.S.R. ........................... 343/5 SA

OTHER PUBLICATIONS

David E. Weissman; Two Frequency Radar Interferometry Applied to the Measurement of Ocean Wave Height; IEEE Transactions on Antennas & Propagation, vol. AP-21, No. 5; Sept. 1973, pp. 649-656.

Primary Examiner—T.H. Tubbesing
Attorney, Agent, or Firm—R. S. Sciascia; Philip Schneider; David G. Rasmussen

[57] ABSTRACT

A coherent stepped dual-frequency, ocean-wave, spectrometer radar system for measuring the characteristics of ocean-surface gravity waves includes: a transmitter for transmitting in successive steps coherently related pairs of frequencies having different, small, and known frequency separations; a coherent receiver for receiving and separating the radar returns of the stepped pairs of frequencies, a frequency-shifter for offsetting the doppler spectrum of each radar return, a multiplier for multiplying together the two frequencies of each pair for each step to obtain a Bragg resonance condition for each step; and a plurality of stepped detectors each for detecting a different step of said multiplier output.

13 Claims, 11 Drawing Figures

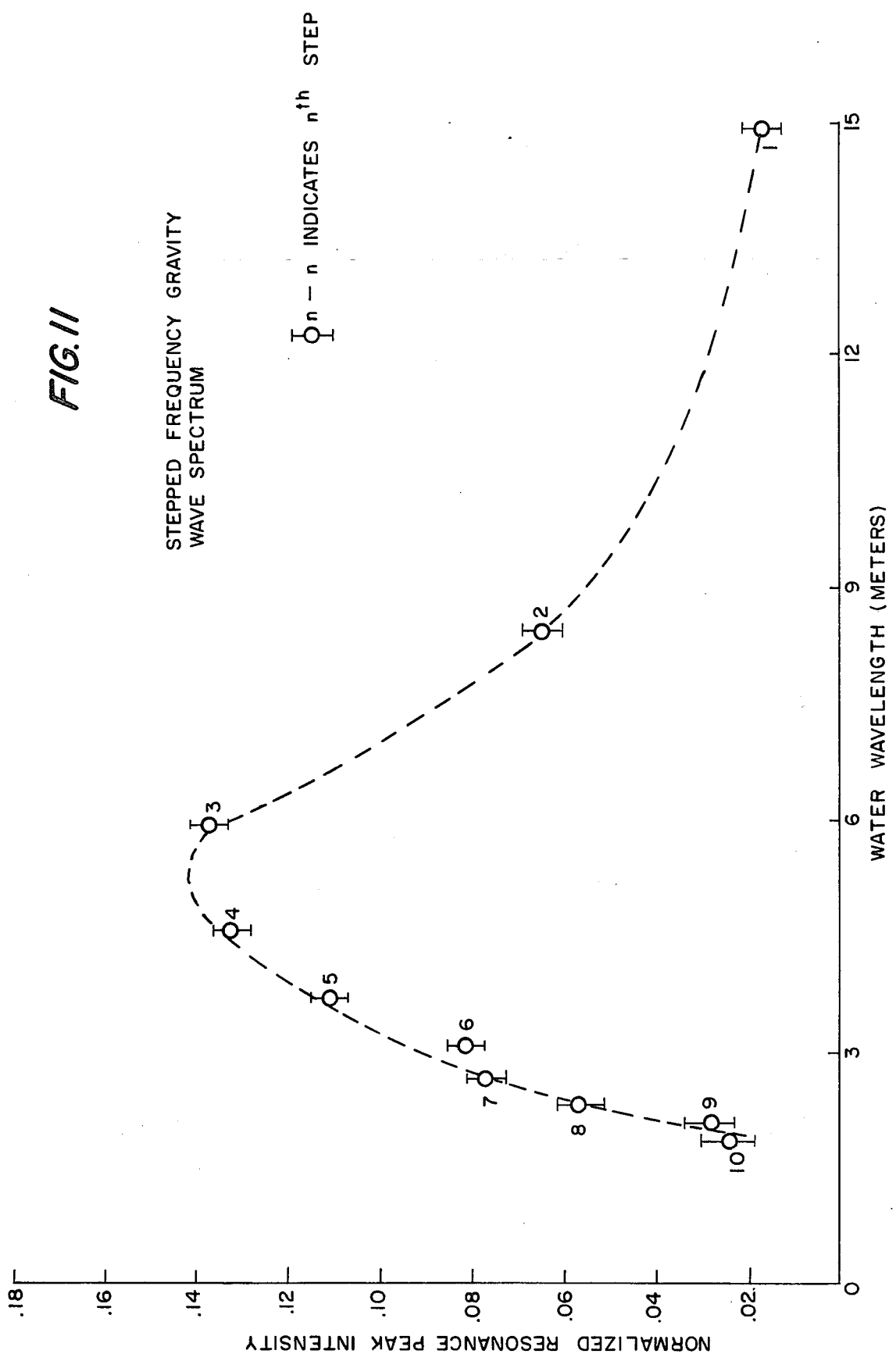

4,053,886

STEPPED DUAL-FREQUENCY, OCEAN-WAVE SPECTROMETER

BACKGROUND OF THE INVENTION

1. Field of the Invention

The invention relates to an ocean-wave spectrometer radar system for measuring the characteristics of gravity waves. More particularly, the invention relates to a coherent, stepped dual-frequency, microwave radar in which the stepped radar-return signals are multiplied and signal-processed to obtain gravity wave information

2. Description of the Prior Art

Wave staffs, pressure sensors, current meters, cameras and laser profilometers have been used to measure the characteristics of ocean surface gravity waves having wavelengths of the order of meters to hundreds of meters and frequencies of the order of Hz or less. These methods all have deficiencies such as: disturbing the surface wave system; requiring deployment in awkward arrays to get directional information; operating in less than real time; and, in the case of the laser profilometer, requiring scanning through several directions.

Radar systems have also been used to measure ocean surface-wave properties and have the advantage that they are remote sensing instruments. Single-frequency microwave radars have been used to measure capillary wave amplitudes (i.e., centimeter wavelengths), as well as certain properties of longer waves (e.g., sea state of significant wave height). These single-frequency radars have two main disadvantages when used to measure gravity wave properties: they react to waves propagating in all directions; and they combine the effects of many wavelengths. A profile of the sea-surface reflectivity may be obtained with a high-resolution single-frequency radar. Such a radar, however, does not selectively respond to a single-wavelength gravity wave propagating in a preferred direction. High-frequency (HF) radars have been used to measure properties of gravity waves but are limited in their operation due to their large antenna size and the restriction that they cannot operate freely in the broadcast band.

A concurrently filed patent application, Navy patent application, Ser. No. 743,372, Dual Frequency, Remote, Ocean Wave Spectrometer by John W. Wright, William J. Plant and Dale L. Schuler, is an ocean-wave spectrometer radar system which utilizes radar reflections from capillary waves to measure the frequency and characteristics of gravity waves. This system overcomes the difficulties of the previously described prior-art systems by has the difficulty that it takes too long to measure the characteristics of a multiplicity of gravity waves. Sea-surface conditions may change in this period of time.

SUMMARY OF THE INVENTION

The present invention is an improvement to copending Navy patent application, Ser. No. 743,372. The present invention parallelly processes a number of different gravity-wave frequencies, thus allowing the radar reflection data for the various gravity-wave frequencies to be obtained simultaneously. This shortens the time needed to take the data and reduces inaccuracies due to changing sea-surface and wind conditions.

In general, the present invention recognizes that capillary waves are modulated by all frequencies of gravity waves on the water surface and that this modulation pattern moves with the gravity-wave motion. This movement will cause a doppler shift in radar reflections from the capillary waves. Since the gravity-wave motion results from multiple gravity waves, the radar reflections will contain a spectrum of coppler frequencies. From observing the spectrum of doppler frequencies, it is not possible to correlate the doppler frequencies with the gravity waves which caused them. It is, therefore, not possible to ascertain whether a specific-frequency gravity wave is present on the ocean surface.

For each gravity-wave frequency to be detected, the invention utilizes a pair of frequencies to obtain a pair of doppler spectra. The two frequencies have a known frequency separation. The doppler spectra from each of the dual channels are filtered in a precorrelation filter and correlated in a multiplier. If a gravity wave is present on the ocean surface, which is related to the frequency separation of the dual channels, a Bragg resonance will occur when the doppler spectra are multiplied. The resonance will indicate the frequency and other characteristics of the gravity wave. Processing of radar returns to determine the presence of one gravity-wave frequency takes about 500 seconds. To obtain multiple gravity-wave frequencies in serial would take too long and allow sea surface and wind conditions to change. The present invention allows several gravity-wave frequencies to be processed in parallel, thus reducing the processing time.

Specifically, the system includes a continuous-wave, stepped dual-frequency, microwave transmitter, which periodically transmits, in successive steps, pairs of frequencies having different, small, and known frequency separations. A coherent receiver receives and separates the radar reflections of the two frequencies of each step. Since the radar system is coherent, a stepped local-oscillator signal is fed from the transmitter to the receiver. A frequency shifter is utilized to shift the stepped local-oscillator frequency by several hundred cycle. The purpose of this is to offset the doppler spectrum of the detected radar return for each channel from D.C. by several hundred cycles to present spectrum foldover.

The two radar returns of each step are fed to a precorrelation filter which passes, for each radar return, a narrow band of doppler-shifted radar returns from capillaries bunched near gravity-wave crests. A multiplier receives the two filtered radar returns for each step from the precorrelation filter and multiplies them.

The output of the multiplier is fed to a group of parallel stepped detectors each of which samples the multiplier output for a selected step and repeats the sampling for each periodic transmission of the steps. This allows all frequency steps to be processed in parallel.

If a spectral peak or resonance line is produced in the Fourier transform of a particular one of the stepped detector outputs, this indicates that a gravity wave is present possessing a wavelength that will satisfy a Bragg resonance condition for the specific frequency separation of the particular step. Spectral lines may be present on more than one step. To observe the resonance lines, each stepped detector output is signal-processed in a spectrum analyzer which Fourier-transforms the output to provide a power spectrum and then averages a number of the power spectra to provide an output spectrum showing the resonance line as well as a broad background spectrum.

A novel feature of the invention is the transmission, in successive steps, of pairs of coherent transmitter frequencies switch each pair having a different frequency separation. Each different frequency separation is related to the Bragg resonance condition for a different wavelength gravity wave.

Another novel feature of the invention is the stepped detector which allows the multiplied radar returns for each step to be sampled periodically which, in turn, allows parallel processing to take place.

BRIEF DESCRIPTION OF THE DRAWINGS

FIG. 11 is a graph showing the gravity-wave spectrum, derived from the output of the spectrum analyzer, which is the desired output of the system.

DESCRIPTION OF THE PREFERRED EMBODIMENT

Figure 1:
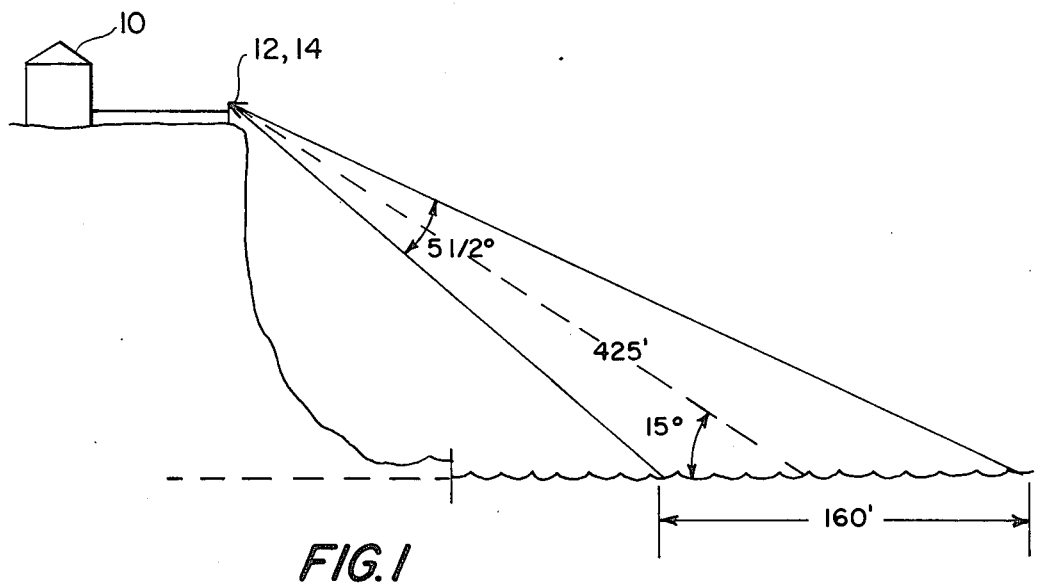
FIG. 1 is an elevation view of radar apparatus, and dual transmitting and receiving antennas and their respective antenna patterns, for the stepped-frequency, ocean-wave, spectrometer radar system.

A system for measuring the characteristics of ocean-surface gravity waves is outlined in FIG. 1. The transmitting and receiving apparatus of the system is housed in enclosure 10 which is on a hill overlooking the ocean surface. Antennas 12, 14 are remote from enclosure 10 and are shown as projecting their antenna patterns on the surface of the water. Antennas 12, 14 are the transmitting and receiving antennas, respectively. Both have the same antenna pattern which may, for example, be 5.5° wide and at an incidence angle of 15° to the water surface.

Figure 2:
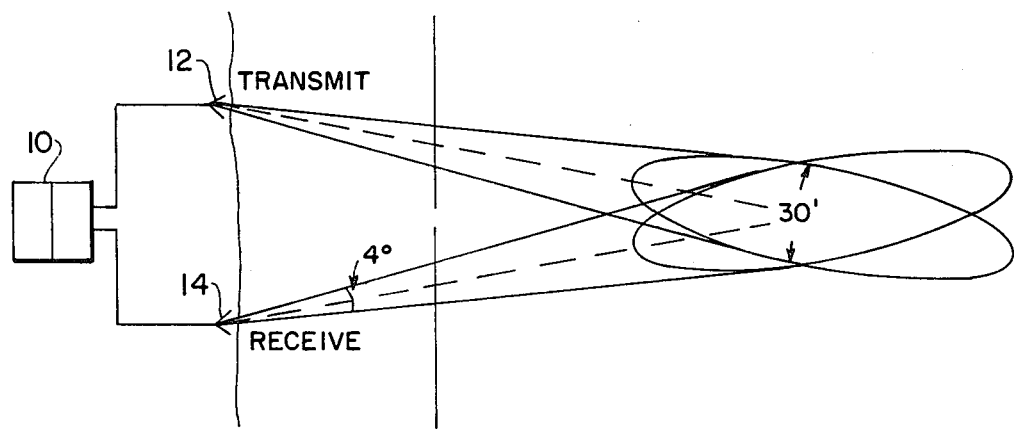
FIG. 2 is a plan view of the radar apparatus and the dual receiving and transmitting antennas and their respective antenna patterns of FIG. 1.

FIG. 2 shows a top view of enclosure 10, antenna 12 and its associated beam pattern for transmitting, and antenna 14 and its associated beam pattern for receiving. The antenna patterns for antennas 12, 14 may be 4° in width and overlap at the surface of the water to ensure a maximum radar-return signal. The antennas are separated, for example, by 36 feet, to provide isolation from direct signal feedthrough.

Figure 3:
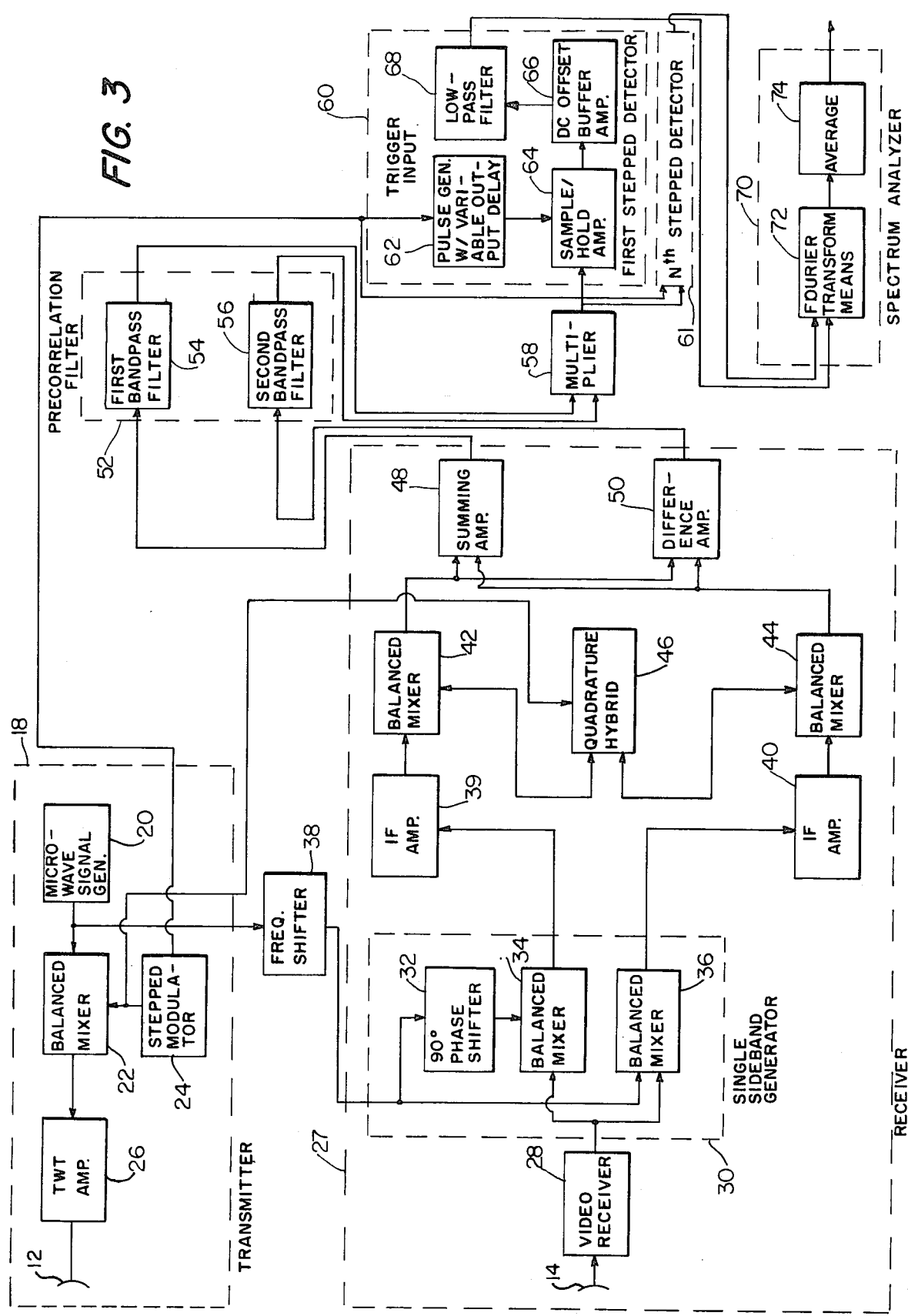
FIG. 3 is a block schematic diagram of the stepped-frequency, ocean-wave, spectrometer radar system.

FIG. 3 is a schematic view of the stepped-frequency, ocean-wave, spectrometer radar system. A transmitter 18 is used to generate, in successive steps, pairs of microwave frequencies, preferably at X band, with known frequency separations. Specifically, transmitter 18 includes a microwave singal generator 20, for example, an LFE (Laboratory FOr Electronics) Model 814-X-1, which generates a continuous-wave, X-band frequency of 9300 MHz. This frequency is directed to a balanced mixer 22, for example, an EM Laboratories Model X142LTI double balanced mixer. Balanced mixer 22 additionally receives a stepped input frequency from stepped modulator 24. Stepped modulator 24 generates a periodic, increasing, staircase signal which, for example, consists of 10 frequency steps with each step having a different and progressively larger frequency in the range of 3.5 MHz to 75 MHz. The staircase is 2 milliseconds long and is repeated at this interval.

Each step is 200 μsec long. The X-band signal is modulated by the stepped modulation signal, and the resultant signal generated by balanced mixer 22 is a periodic series of steps with each step consisting of two sideband frequencies separated by twice the input frequency of the corresponding step of the signal of stepped modulator 24. The center frequency from signal generator 20 is suppressed. Stepped modulator 24 may be a Hewlett Packard Frequency Synthesizer Model 8660 B modified to step its output. The stepped output of balanced mixer 22 is fed to a traveling wave tube (TWT) amplifier 26 which amplifies the stepped frequency pairs and forwards them for transmission to antenna 12, which may be a parabolic dish antenna two feet in diameter.

A composite radar-return signal containing the stepped pairs of frequencies plus intelligence imparted to the frequencies by the surface of the water is received by coherent receiver 27 through antenna 14, which may be identical to antenna 12. The signal is passed to video receiver 28, for example, an Aertech Model S7001, which acts as a sensitive pre-amplifier for the weak return signals.

In general, the receiver circuitry after video receiver 28 is a conventional phase-matching circuit using two stages of IF and sum and difference circuits to beat down and separate the radar returns of the two frequency channels of each step while still maintaining their phase relationship.

More specifically, the output of video receiver 28 is fed to a single-sideband generator 30 whose purpose is to beat down the stepped frequency pairs of the radar-return signal to first IF signals. Single-sideband generator 30 includes a 90° phase shifter 32 and balanced mixers 34, 36, all three of which may, for example, by a Microwave Development Laboratories Model 906S76-1. The signal from video receiver 28 is fed to balanced mixers 34, 36. The latter balanced mixers also receive local-oscillator signals from microwave signal generator 20 via frequency shifter 38. Frequency shifter 38 is a resonant cavity using a rotating dipole to shift the local oscillator frequency by several hundred Hz. As will be explained subsequently, this shift will cause the stepped frequencies to be lowered to a 120 Hz reference rather than D.C. This means the doppler spectrum of each frequency will be referenced about 120 Hz, thus preventing spectrum foldover.

The shifted local-oscillator frequency is fed directly to balanced mixer 36 and through 90° phase shifter 32 into balanced mixer 34. The outputs of balanced mixers 34, 36 are the first IF signals. These signals are fed through IF amplifiers 39 and 40 to balanced mixers 42, 44, for example, Hewlett Packard Model HP10514 double balanced mixers. Balanced mixers 42, 44 also receive the output of modulator 24 through quadrature hybrid 46, for example, a Merimac Model QH-7. Quadrature hybrid 46 provides one signal output in-phase with its input and another signal output 90° out-of-phase with its input, The modulator signal beats the first IF signals in balanced mixers 42, 44 down to second IF frequencies of 120 Hz. The outputs of balanced mixers 42, 44 are then fed in parallel to summing amplifier 48 and difference amplifier 50 whose outputs are the doppler spectra of the stepped frequency pairs centered about 120 Hz.

These signals are sent to precorrelation filter 52 which passes only doppler-shifted radar returns from localized, fast-moving capillaries bunched near the gravity-wave crests. This discriminates against doppler-shifted returns that contribute little to the Bragg resonant peak but increase the background. The precorrelation filter is composed of first and second bandpass filters 54 and 56 which receive the outputs of summing and difference amplifiers 48, 50, respectively. The outputs from first and second bandpass filters 54, 56 are sent to multiplier 58, for example, a Princeton Applied Research Model 193, where the stepped signals are multiplied. The output of the multiplier 58 is forwarded to first stepped detector 60 and to each stepped detector up to the Nth stepped detector 61 which may, for example, be the 10th detector.

Each stepped detector is used to detect the radar return of one of the steps of the multiplier output. For purposes of illustration, only first stepped detector 60 will be described. To accomplish detection, stepped detector 60 samples a selected step, for example, the first step during each transmission period and generates an output signal derived from the samples.

Figure 6:
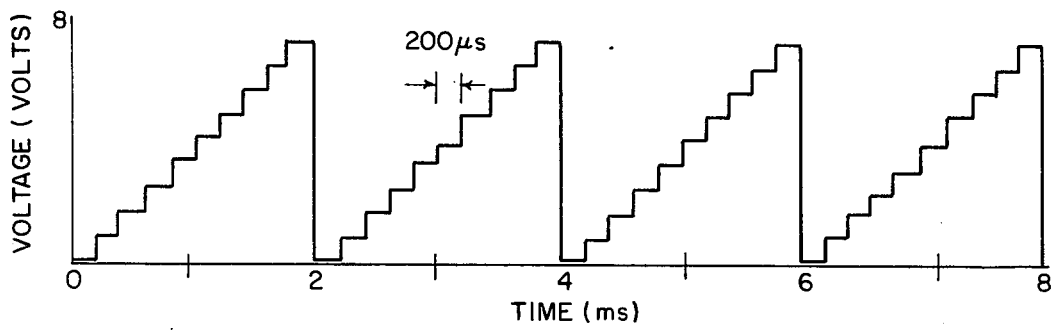
FIG. 6 is a graph of a stepped staircase voltage generated by the stepped modulator of FIGS. 3, 4.

Stepped detector 60 includes a pulse generator with variable output delay 62, for example, a Hewlett-Packard model 8012A which receives a sync pulse from stepped modulator 24. The sync pulse is shown in FIG. 6 and is synchronous with the beginning of each transmitted staircase of frequencies. Pulse generator 62 has a variable delay which will cause an output pulse to be generated at a selected delay period after the sync pulse is received. The selected delay will correspond to a particular step to be sampled. In the case of stepped detector 60 the delay is zero since the first step is selected to be sampled and detected.

The delayed output pulses of pulse generator 62 are fed to a sample-and-hold amplifier 64, for example, a Datel model SHM-3. Sample-and-hold amplifier 64 samples the output of multiplier 58 each time the delayed ouput pulse of pulse generator 62 is received. The output of sample-and-hold amplifier 64 is an approximation of the multiplier output for the selected step, in this case the first step.

The output of sample-and-hold amplifier 64 is fed to a D.C. offset buffer amplifier 66 which filters the DC generated in sample-and-hold amplifier 64. The output of buffer amplifier 66 is fed to a low-pass filter 68 which cuts off all frequencies above 10 Hz to prevent foldover of the spectrum. Similiarly, stepped detectors up to Nth stepped detector 62 sample and detect the remaining steps of the multiplier output.

The output of low-pass filter 68 is fed to spectrum analyzer 70, for example, a Nicolet Scientific Model UA500-A Fourier analyzer which includes: a Fourier-transform means 72 which provides a power spectrum of the output of stepped detector 60 and an averager 74 which will average sample spectra over a period of time. The spectrum analyzer, for example, will develop one normalized sample spectrum from 0-10 Hz in about 50 seconds and average about 10 of the sample spectra to get the output spectrum. The use of spectrum analyzer 70 is within the state of the art and other utilization means for processing and using the outputs of the stepped detectors are also within the state of the art.

Basic to the invention was the discovery that a conventional, linar, continuously changing, frequency separation between the dual-frequency channels could not be used in parallelly processing multiple gravity-wave frequencies. There were two problems with this approach. First, the first local-oscillator frequency generated by the modulator in the transmitter would change frequency between the time of transmission and the time of reception of the radar return. This change in first local-oscillator frequency would change the desired 120 Hz offset frequency by a minimum of several hundred KHz which would be intolerable. Secondly, the frequency of the radar returns from the front edge of the antenna footprint (approximately 84 meters wide at a range of 0.5 miles) would be different than the frequency of the radar returns from the back edge due to the change in transmitter frequency with time. This has the effect of generating a band of second IF frequencies which would completely mask the desired doppler spectrum which is only approximately 100 Hz wide and centered bout 120 Hz.

The present system overcomes these problems by using serial steps in which the frequency separation for each step is constant. This makes the transmitter and first local-oscillator frequency constant during the time of transmission and reception of each step. Furthermore, each step is 200 $\mu$sec long which makes the frequency of the radar returns from the front and rear edges of the antenna footprint the same.

Figure 4:
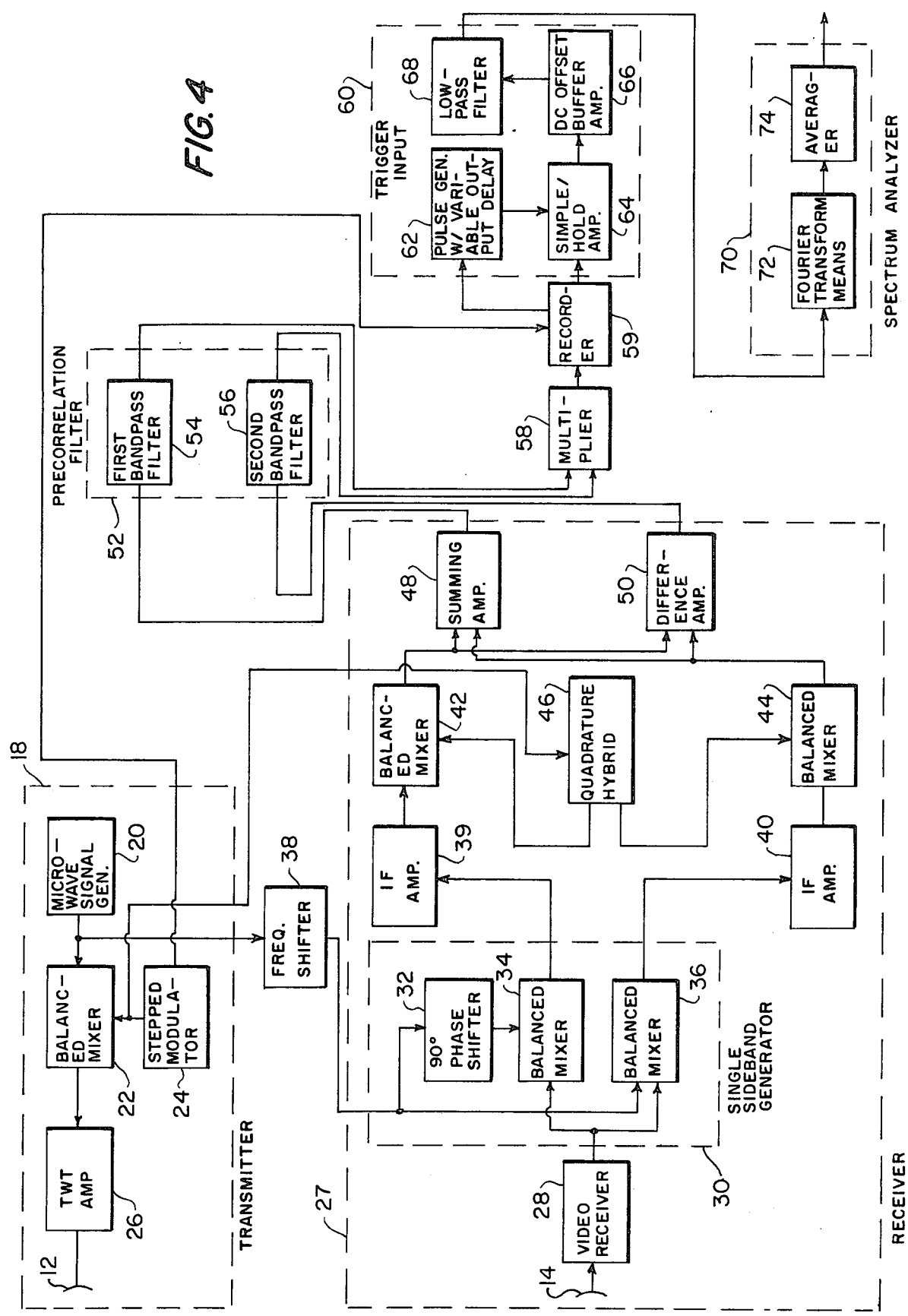
FIG. 4 is a block schematic diagram of an alternative embodiment of a stepped-frequency, ocean-wave, spectrometer radar system.

FIG. 4 is a schematic view of an alternative embodiment of the stepped-frequency, ocean-wave, spectrometer system. Transmitter 18, receiver 27, precorrelation filter 52, multiplier 58 and spectrum analyzer 70 are identical with those of the system of FIG. 3. In FIG. 4 rather than parallelly processing each step with a discrete stepped detector, as in FIG. 3, the stepped output from multiplier 58 and sync pulses from stepped modulator 24 are recorded by recorder 59, for example an analog tape recorder, for later remote detection and signal-processing. Note, that the stepped output data which is recorded is the identical data taken over the same time period as that which would be parallelly processed in the system of FIG. 3. The recorded data will be provided to a stepped detector 60 identical in structure and operation to that of FIG. 3. Each step of the stepped output signal of multiplier 58 will be detected serially by readjusting the time delay of pulse generator with variable output delay 62 after detection of each step. The serially detected steps are then passed on to spectrum analyzer 70 for signal processing.

Figure 5:
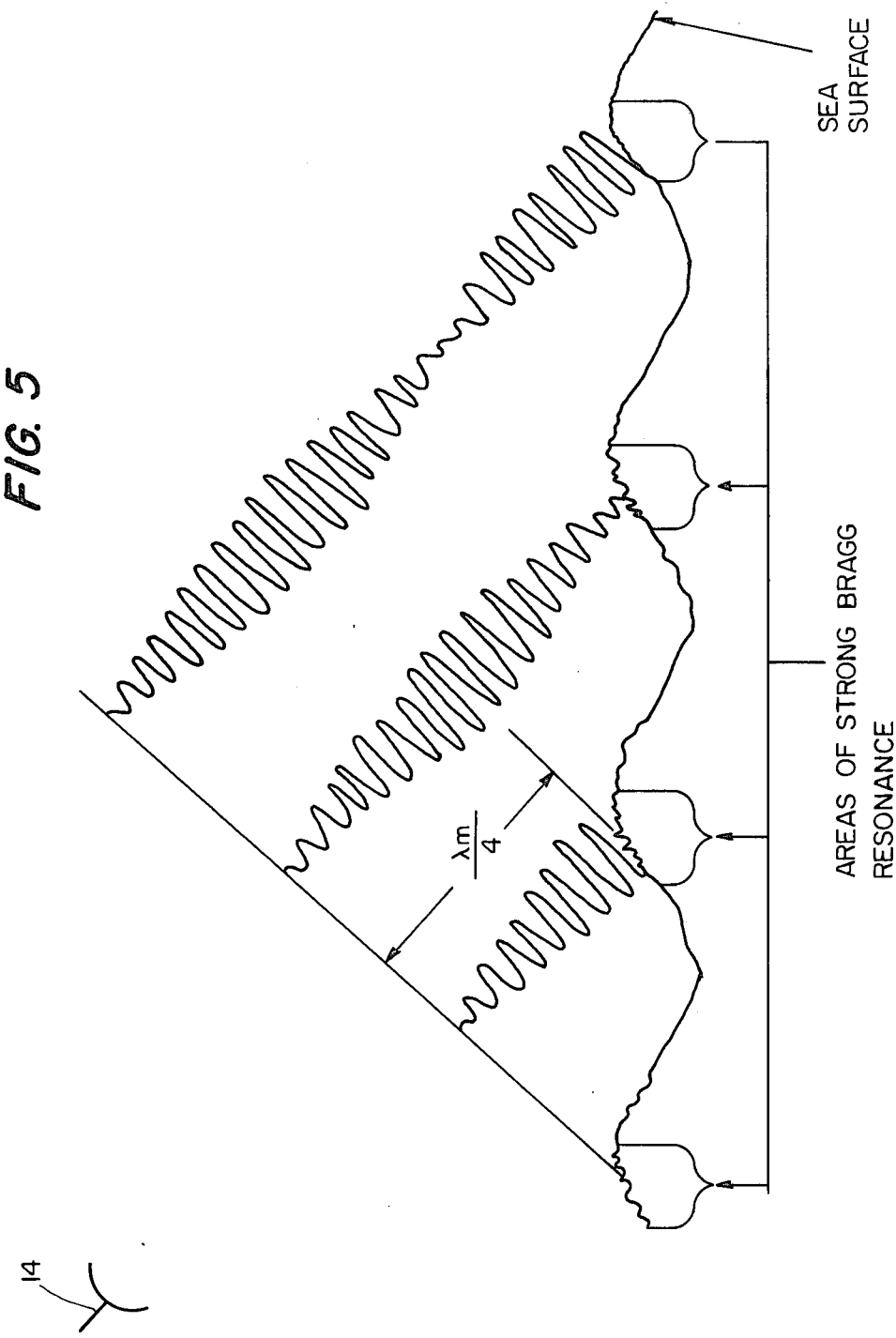
FIG. 5 is a diagrammetic view of the Bragg resonance condition for both capillary and gravity waves.

FIG. 5 illustrates the Bragg resonance conditions for both capillary and gravity waves. Bragg resonance means that radar returns at a particular incidence angle to the water surface, backscattered from a particular periodic wave structure, are in-phase along a planar front and are received in-phase at antenna 14. Examining the Bragg response condition for capillary waves, the dual frequencies transmitted for each step result in radar returns primarily as a result of first-order Bragg scattering due to small capillary waves, shown in FIG. 5 as areas producing strong backscattered returns. The two transmitted frequencies are very close and hence have the same Bragg resonance which is defined by the relation:

$$\frac{2\pi}{\tau c} = 4\pi \frac{f_i}{C} \cdot \cos\theta$$

where:

$f_t$ is the transmitted frequency
$\theta$ is the grazing angle
C is the speed of light
$\tau_c$ is the capillary wavelength The Bragg resonance is apparent for capillary waves because the radar returns from the capillary waves are in phase and add.

Looking at the Bragg resonance condition for gravity waves, it is first noted that the capillary wave amplitudes are modulated by the gravity waves and that the modulation pattern moves with the gravity waves. This modulation causes a spectrum of doppler shifts in the radar returns from the capillary waves.

To illustrate this, a stationary target would generate a radar return with no doppler shift, which would show up as a spike at 120 Hz (i.e., the offset frequency). Capillary waves moving with the gravity-wave modulation pattern would be doppler-shifted and the radar return would show up, for example, centered about a frequency of 100 Hz. Because the different-frequency gravity waves all cause different doppler shifts, the radar return would not be a spike but would be a widened line made up of a number of frequency lines centered about 100 Hz. Such a doppler spectrum would not permit the doppler shift for a specific gravity-wave frequency to be picked out.

To determine such a gravity-wave frequency, the precorrelation filter outputs for the dual frequencies of each step are beat together in multiplier 58, shown in FIG. 3. If a Bragg resonance occurs in any of the steps of the multiplier output, this indicates the presence of a gravity wave at the same frequency as the resonance. The Bragg resonance is possible because coherent detection in the receiver preserves the relative phases of the signals in both channels. The Bragg resonance condition for gravity waves is as follows:

$$\frac{2\pi}{\tau_g} = 4\pi \frac{\Delta f}{C} \cos \theta$$

where:

$\theta$ is the grazing angle
C is the speed of light
$\Delta f$ is the frequency separation of the channels
$\tau_g$ is the gravity wavelength.

FIG. 6 shows a staircase voltage generated by stepped modulator 24. This voltage is easily available from stepped modulator 24 and is a convenient voltage to use as a periodic sync signal to pulse generator with variable output delay 62 of FIG. 3. The beginning of the staircase voltage triggers pulse generator 62 and does so periodically at 2 millisecond intervals. The sync signal synchronizes the staircase of transmitted frequencies with the detection of the stepped multiplier output in stepped detector 60. The staircase voltage is used only because of convenience and other types of sync signals could easily be used.

Figure 7:
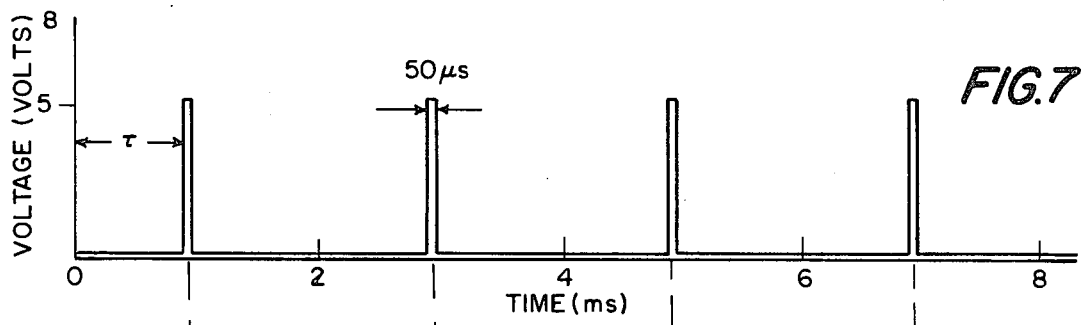
FIG. 7 is a graph of the control pulses from the pulse generator with variable output delay of FIG. 3, 4.

FIG. 7 shows the output pulses of pulse generator with variable output delay 62 of FIG. 3, which are positioned with a delay such that the fifth step of the multiplier 58 output is being sampled during each 2 millisecond period. The pulses are provided to sample-and-hold amplifier 64 to accomplish the sampling.

Figure 8:
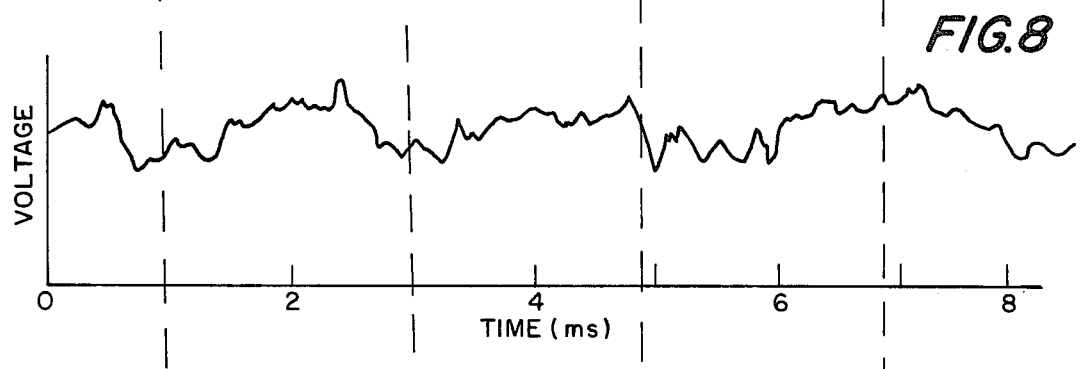
FIG. 8 is a graph of the stepped frequency output signal of the multiplier of FIGS. 3, 4.

FIG. 8 shows the stepped output of multiplier 58 taken over a number of 2 millisecond transmission periods. Each 2 millisecond period contains a composite signal made up of the 10 steps. The graph shows the output signal being sampled at the fifth step of each 2 millisecond period.

Figure 9:
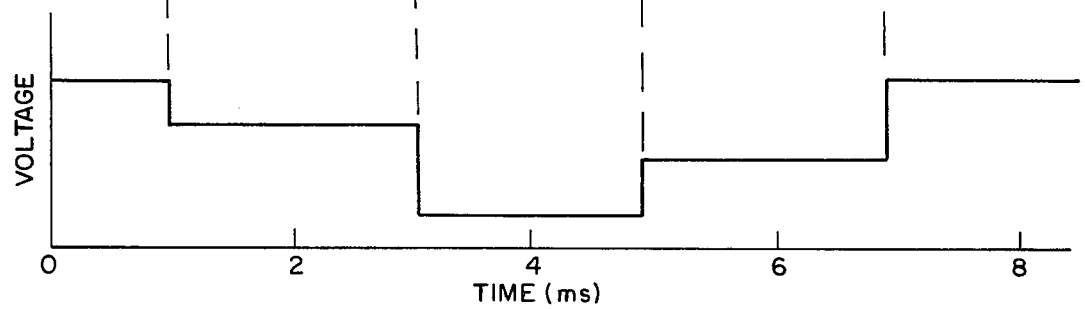
FIG. 9 is a graph of a representative sampled output signal of the sample and hold amplifiers of FIGS. 3, 4.

FIG. 9 shows the output of the sample-and-hold amplifier 64. As each point on the graph of FIG. 8 is sampled, the sample-and-hold circuit generates a voltage with the magnitude of the sample signal and holds it until the next sample is taken. The output of the sample-and-hold circuit is an approximation of the fifth step of multiplier output. The sample-and-hold circuits of the stepped detectors of FIG. 3 will each similiarly provide an approximation of the multiplier output for one of the output steps.

Figure 10:
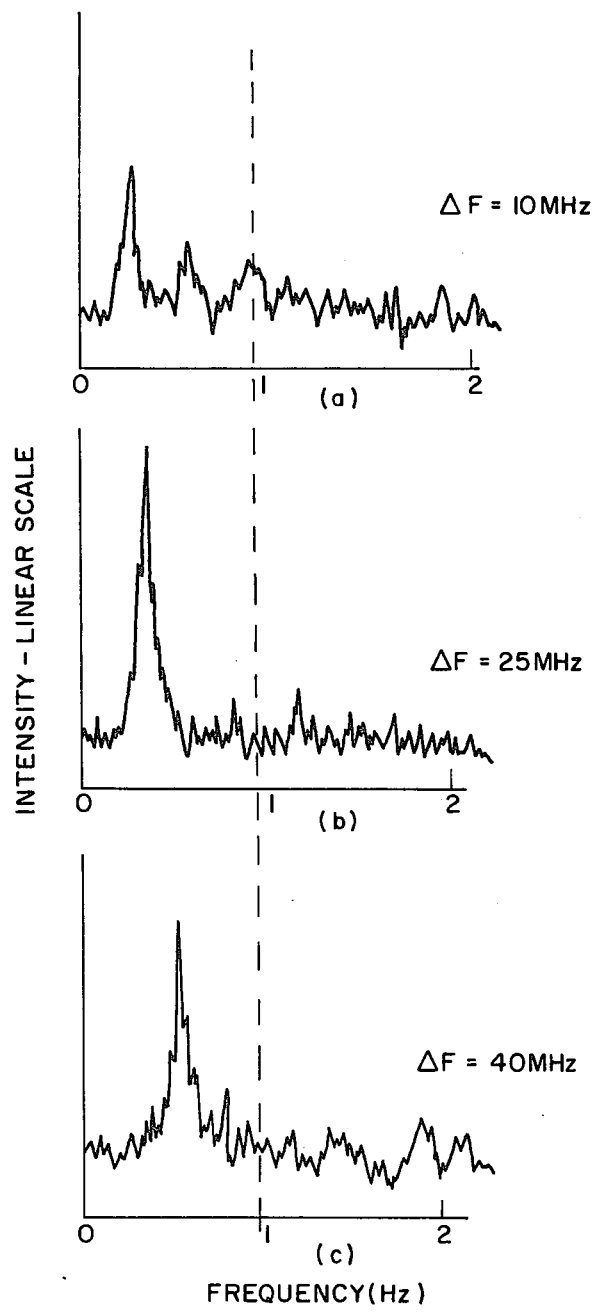
FIG. 10 is a plurality of graphs of the outputs of the spectrum analyzer of FIGS. 3, 4 for three values of frequency separations between transmitted frequencies.

Graphs (a) through (c) of FIG. 10 show the outputs (i.e. power spectrum) of spectrum analyzer 70 for data taken for three different steps having different frequency separations. The prominent line of each graph represents the frequency of the gravity wave detected for the respective steps. It is observed that as the frequency separation increases in FIG. 10 from graph (a) to graph (c) the prominent peaks shift to a higher frequency indicated that gravity waves of higher frequency are present on the ocean surface.

FIG. 11 shows the gravity wave spectrum derived from the output of spectrum analyzer 70. The normalized resonance peak intensity is plotted against the wavelength.

In operation, microwave signal generator 20 generates a center frequency of 9300 MHz which is fed to double balanced mixer 22 which also receives a staircase of frequency steps over the range of 3.5–75 MHz from modulator 24. In double balanced mixer 22, two sidebands are generated and the center frequency is suppressed from each step. The frequency separations between the sidebands for the steps will be progressively larger for each serial step and will range from 7–150 MHz which is twice the modulator frequency. The frequency pairs are amplifieid by traveling wave tube 26 and transmitted through antenna 12.

The reflected radar returns for the frequency pairs are received by antenna 14 and fed to video receiver 28 which in turn forwards the signal to balanced mixers 34, 36. Balanced mixer 34 additionally receives the local-oscillator signal shifted in frequency by 120 Hz by frequency shifter 38 and phase-shifted by 90° by phase shifter 32. Balanced mixer 36 additionally receives the 120 Hz shifted local-oscillator frequency. Th first IF outputs of balanced mixers 34, 36 are 90° out of phase because of the phase shift in phase shifter 32. This phase shift is necessary for the phase-matching operation of the receiver. The purpose for detecting and separating the radar returns of the two frequencies of each step using the coherent phase-matching technique rather then incoherent detection is to preserve the phases of the radar-return signals of the frequencies. This phase preservation allows the signals to be coherently processed by the multiplier and hence obtain Bragg resonance as will be explained subsequently.

IF amplifiers 39, 40 receive the first IF signals from balanced mixer 34 and 36, respectively, and pass the signal to balanced mixers 42, 44 where the second IF signals of 120 Hz are generated. To accomplish this, balanced mixers 42, 44 receive a second local-oscillator frequency from modulator 24 through quadrature hybrid 46. Quadrature hybrid 46 shifts by 90° the local-oscillator frequency to balanced mixer 42.

The 120 Hz second IF signals out of balanced mixers 42, 44 are the difference and sum, respectively, of the returns of the two frequency pair of each step. These and both forwarded in parallel to summing and difference amplifiers 48, 50 which complete the phase-matching circuit and separate the radar-return signals for both frequencies of each step while still maintaining their phase relationship. The output of the summing amplifier 48 is the upper sideband signal for each step beat down to 120 Hz. Similarly, the output of the difference amplifier 50 is the lower sideband signal for each step beat down to 120 Hz. The upper and lower sideband signals for each step are composed of spectra of doppler frequencies nearly centered about the 120 Hz reference. This shows up as a widening of the 120 Hz reference by typically 50–100 Hz at the 3 db points. The various doppler components result primarily from the advection of the capillary waves by different gravity waves on the ocean surface.

The radar returns from summing and difference amplifiers 48, 50 are filtered by bandpass filters 54 and 56 which filter out all doppler components except those from fast moving capillaries bunched near gravity-wave crests. This will enhance the Bragg resonance peak and reduce the background. First and second bandpasas filters 54 and 56 may be deleted; however, performance of the system is significantly enhanced with the filters.

The outputs of first and second bandpass filters 54, 56 are fed to multiplier 58 where the signals are multiplied together. The multiplication filters the high-frequency components and the presence of a Bragg resonance line for any step indicates that a gravity wave related to the frequency separation for that step is present on the ocean surface.

It is not possible to distinguish each step in the output of multiplier 58 as can be seen from the graph of the multiplier output shown in FIG. 8. Therefore it is necessary to separate each step by means of the first through Nth stepped detectors 60, 61. The output of multiplier 58 is fed to each stepped detector. Looking at first stepped detector 60, the staircase sync pulses from stepped modulator 24 are fed to pulse generator with variable output delay 62. The time delay $\tau$ of pulse generator 62 is set at zero such that pulse generator 62 will generate control pulses that will be sent to sample-and-hold circuit 64 to sample the first step. The sample-and-hold circuit will approximate the output of multiplier 58 for the first step. The output of the sample-and-hold circuit is fed to D.C. offset buffer amplifier 66 which removes a D.C. introduced by the sample and hold circuit. The output of buffer amplifier 66 is then filtered by low-pass filter 68 which removes all frequencies above 10 Hz to prevent foldover of the spectrum. Each stepped detector will similiarly detect one of the steps of the output of multiplier 58.

The outputs of the stepped detectors are fed to spectrum analyzer 70 which Fourier-transforms each output in Fourier transformer 72 to provide a frequency spectrum for each step. For each individual step the frequency spectrum is fed to an averager 74 which will average about 10 spectra. Such averaged spectra are shown in graphs (a)–(c) of FIG. 10. If a peak is found in the spectrum, this indicates that a gravity wave of the appropriate frequency is present on the ocean surface. Similiarly peaks found in the averaged spectrum of the other steps will indicate presence of other-frequency gravity waves.

The wave spectrometer provides new information about the properties of wind-generated, surface water wave systems. In particular, the following measurements are possible:

a. The gravity wave dispersion relationship for both deep and shallow water conditions.
b. The directional gravity-wave modulation power spectrum.
c. The dominant wavelength, frequency and direction of a water wave system.
d. The advection of gravity waves by longer waves and by surface water currents.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An ocean-wave, spectrometer radar system comprising:
   transmitter means for generating a first local oscillator frequency and a sync signal, and for transmitting, in successive steps, coherently related pairs of frequencies having different, small, and known frequency separations;
   coherent receiver means for receiving and separating the radar returns of said stepped pairs of frequencies;
   frequency-shifter means connected between said transmitter means and said receiver means for shifting the frequency of said first local-oscillator frequency;
   multiplier means receiving said separated radar returns for said stepped pairs of frequencies from said receiver and multiplying said separated radar returns to obtain a Bragg resonance condition for each step;
   a plurality of stepped detector means, each receiving a sync signal from said transmitter and the output of said multiplier, each for detecting a different step of said multiplier output.
   utilization means receiving the outputs of said stepped detector means, for processing and utilizing the outputs of said stepped detector means.

2. The system of claim 1 in which each said stepped detector means includes:
   pulse-generator-with-variable-output-delay means, receiving said sync signal from said transmitter, for generating an output pulse at a selected delay period after said sync pulse is received;
   sample-and-hold circuit means, receiving said multiplier output and the output of said pulse-generator-with-variable-output-delay means, for sampling the multiplier output each time said output of said pulse-generator-with-variable-output-delay means is received;
   D.C.-offset buffer amplifier means, receiving the output of said sample-and-hold means, for filtering a D.C. voltage generated in said sample-and-hold means; and
   low-pass filter means, receiving the output of said D.C.-offset buffer amplifier, for filtering said output of said D.C.-offset buffer amplifier to prevent foldover of the spectrum.

3. The system of claim 1, including a precorrelation filter connected between said coherent receiver means and said multiplier means for passing, for each frequency, a narrow band of doppler-shifted radar returns from capillaries bunched near wave crests.

4. The radar system of claim 1, in which said utilization means is a spectrum analyzer means receiving the outputs of said plurality of stepped detectors for averaging and Fourier-transforming said outputs of said plurality of stepped detectors to produce power spectrums.

5. An ocean-wave spectrometer radar system comprising:
   transmitter means for generating a first local oscillator frequency and a sync signal, and for transmitting, in successive steps, coherently related pairs of frequencies having different, small, and known frequency separations;
   coherent receiver means for receiving and separating the radar returns of said stepped pairs of frequencies;
   frequency shifter means connected between said transmitter means and said receiver means for shifting the frequency of said first local oscillator frequency;
   multiplier means receiving said separated radar returns from said stepped pairs of frequencies from said receiver and multiplying said separated radar returns to obtain a Bragg resonance condition for each step;
   recorder means for recording the output of said multiplier means and the sync signal from transmitter means; and
   stepped detector means receiving said sync signal and said multiplier output from said recorder for serially detecting the steps of said multiplier output;
   utilization means receiving the output of said stepped detector means, for processing and utilizing the outputs of said stepped detector means.

6. The system of claim 5, including a precorrelation filter connected between said coherent receiver means and said multiplier means for passing for each frequency, a narrow band of doppler shifted radar returns from capillaries bunched near wave crests.

7. The system of claim 5, in which said utilization means is spectrum analyzer means receiving the output of said stepped detector, for averaging and Fourier-transforming said ouput of said stepped detector to produce a power spectrum.

8. An ocean-wave, spectrometer radar system comprising:
   transmitter means including a microwave signal generator, for generating a first local oscillator frequency and a sync signal, and for transmitting, in successive steps, coherently related pairs of frequencies having different, small, and known frequency separations;
   coherent receiver means, including phase-matching circuitry, for receiving and separating radar returns from said stepped pairs of frequencies;
   frequency shifter means recieving the output of said microwave signal generator and providing a frequency-shifted first local-oscillator frequency to said phase-matching circuitry; and
   multiplier means for receiving said separated radar returns from said stepped pairs of frequencies from said receiver and multiplying said separated radar returns to obtain a Bragg resonance condition for each step;
   a plurality of stepped detector means, each receiving a sync signal from said transmitter and the output of said multiplier, each for detecting a different step of said multiplier output;
   utilization means receiving the outputs of said stepped detector means for processing and utilizing the outputs of said stepped detector means.

9. The system of claim 8, including a precorrelation filter connected between said phase-matching circuitry and said multiplier for passing, for each frequency, a narrow band of doppler-shifted radar returns from capillaries bunched near wave crests.

10. The system of claim 9, in which said precorrelation filter includes a pair of bandpass filters each receiving one of the separated radar returns from said phase-matching circuitry.

11. The radar system of claim 10, in which said utilization means is a spectrum analyzer means for receiving the outputs of said plurality of stepped detector means, for averaging and Fourier-transforming said outputs of said plurality of stepped detectors to produce power spectrums.

12. The system of claim 11, in which said transmitter includes:
   stepped modulator means for generating a modulating periodic-frequency signal consisting of a plurality of frequency steps with each step having a different frequency and for generating a periodic-voltage signal consisting of a plurality of voltage steps with each step having a different voltage; and
   balanced mixer means receiving the output of said microwave signal generator and said modulating periodic-frequency signal for generating in successive steps, pairs of frequencies having different, small, and known frequency separations.

13. The system of claim 12, in which said phase-matching circuitry includes:
   single sideband generator means, receiving said radar returns and said frequency-shifted first local-oscillator frequency, for producing a first intermediate frequency in phase with said radar returns and another first intermediate frequency 90° out of phase with said radar returns;
   quadrature hybrid means receiving a second local-oscillator signal from said modulator for providing a local-oscillator output in phase and another 90° out of phase with said second local-oscillator signal;
   a pair of balanced mixer means, one said balanced mixer receiving the in-phase frequencies from said single-sideband generator means and said quandrature hybrid means, and the second said balanced mixer receiving the 90° phase-shifted frequencies from said single-sideband generator means and said quadrature hybrid means for generating one second intermediate frequency in-phase and one second intermediate frequency phase-shifted by 90°;
   summing amplifier means, receiving outputs from each of said pair of balanced mixer means, for separating the radar returns of one of said frequencies of each step; and
   difference amplifier means, receiving outputs from each of said pair of balanced mixer means, for separating the radar returns from the other of said frequencies of each step.

* * * * *